US012315033B2

(12) United States Patent
Glanville

(10) Patent No.: US 12,315,033 B2
(45) Date of Patent: *May 27, 2025

(54) MODIFYING PROCESSING OF COMMANDS IN A COMMAND QUEUE BASED ON ACCESSED DATA RELATED TO A COMMAND

(71) Applicant: Imagination Technologies Limited, Kings Langley (GB)

(72) Inventor: James Glanville, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 303 days.

This patent is subject to a terminal disclaimer.

(21) Appl. No.: 17/732,233

(22) Filed: Apr. 28, 2022

(65) Prior Publication Data

US 2022/0270202 A1 Aug. 25, 2022

Related U.S. Application Data

(63) Continuation of application No. 16/909,011, filed on Jun. 23, 2020, now Pat. No. 11,321,808, which is a (Continued)

(30) Foreign Application Priority Data

Mar. 29, 2018 (GB) ..................................... 1805153

(51) Int. Cl.
*G06T 15/00* (2011.01)
*G06F 12/0802* (2016.01)
(Continued)

(52) U.S. Cl.
CPC ............ *G06T 1/60* (2013.01); *G06F 12/0802* (2013.01); *G06F 2212/302* (2013.01); *G06T 1/20* (2013.01); *G06T 2200/28* (2013.01)

(58) Field of Classification Search
CPC  G06T 1/20; G06T 1/60; G06T 15/005; G06T 15/06; G06T 15/80; G06F 9/3816; G06F 12/0862

See application file for complete search history.

(56) References Cited

U.S. PATENT DOCUMENTS 10,529,123 B2  1/2020  Redshaw
10,747,663 B2  8/2020  Yoshii et al.
(Continued)

FOREIGN PATENT DOCUMENTS

CA        2415583 A1   7/2003
CN     101685391 A     3/2010
(Continued)

*Primary Examiner* — Phuc N Doan
(74) *Attorney, Agent, or Firm* — Potomac Law Group, PLLC; Vincent M DeLuca

(57) ABSTRACT

Processing of commands at a graphics processor are controlled by receiving input data and generating a command for processing at the graphics processor from the input data, wherein the command will cause the graphics processor to write out at least one buffer of data to an external memory, and submitting the command to a queue for later processing at the graphics processor. Subsequent to submitting the command, but before the write to external memory has been completed, further input data is received and it is determined that the buffer of data does not need to be written to external memory. The graphics processor is then signalled to prevent at least a portion of the write to external memory from being performed for the command.

19 Claims, 6 Drawing Sheets

Related U.S. Application Data continuation of application No. 16/369,270, filed on Mar. 29, 2019, now Pat. No. 10,726,520.

(51) Int. Cl.
  *G06T 1/20* (2006.01)
  *G06T 1/60* (2006.01)
  *G06T 15/06* (2011.01)

(56) References Cited

U.S. PATENT DOCUMENTS

| | | | |
|---|---|---|---|
| 10,795,604 | B2 | 10/2020 | Silbermintz et al. |
| 2002/0049888 | A1 | 4/2002 | Hertwig et al. |
| 2004/0257373 | A1 | 12/2004 | Doyle et al. |
| 2010/0005271 | A1 | 1/2010 | Wada et al. |
| 2011/0080419 | A1 | 4/2011 | Croxford et al. |
| 2014/0122809 | A1* | 5/2014 | Robertson ........... G06F 12/0804 711/E12.017 |
| 2014/0122812 | A1* | 5/2014 | Hakura ................... G06T 1/20 711/144 |
| 2017/0076421 | A1 | 3/2017 | Hartog et al. |
| 2018/0018101 | A1 | 1/2018 | Benisty et al. |
| 2018/0095677 | A1* | 4/2018 | Chrobak ................ G09G 5/393 |
| 2018/0181491 | A1* | 6/2018 | DeLaurier ............ G06F 12/084 |
| 2020/0379909 | A1* | 12/2020 | Uhrenholt ........... G06F 12/0831 |

FOREIGN PATENT DOCUMENTS

| | | |
|---|---|---|
| CN | 105518742 A | 4/2016 |
| CN | 106960412 A | 7/2017 |
| GB | 2474114 A | 4/2011 |

\* cited by examiner

MODIFYING PROCESSING OF COMMANDS IN A COMMAND QUEUE BASED ON ACCESSED DATA RELATED TO A COMMAND

CROSS REFERENCE TO RELATED APPLICATION AND CLAIM OF PRIORITY

This application is a continuation under 35 U.S.C. 120 of application Ser. No. 16/909,011 filed Jun. 23, 2020, now U.S. Pat. No. 11,321,808, which is a continuation of prior application Ser. No. 16/369,270 filed Mar. 29, 2019, now U.S. Pat. No. 10,726,520, which claims foreign priority under 35 U.S.C. 119 from United Kingdom Application No. 1805153.2 filed Mar. 29, 2018.

BACKGROUND

The present disclosure relates to methods and systems for controlling processing. In particular, the present disclosure relates to methods for controlling processing of commands at a graphics processor, such as processing of graphics rendering commands, and graphics processing systems.

In computer processing systems, such as 3D graphics processing systems, an input data stream is processed at a processor. Typically, a driver at a host processor such as a central processing unit (CPU) will process the input data stream, and will output at least one command configured to cause a graphics processing unit (GPU) to perform an operation such as rendering an image. In some cases, commands may cause the GPU to operate on data stored in a local memory, such as an on-chip memory. A command may also cause the locally-stored data to be written to external memory by the GPU, for later use. The execution of this write to external memory has an associated cost in terms of power consumption and memory bandwidth in performing the write operation. A read operation, also with a similar associated cost, can cause data stored in the external memory to be accessed.

At the application level, the provision of API functions, such as glInvalidateFrameBuffer( ), which signal that a memory's contents will not be used again, can be used to explicitly manage the usage of memory. Such API functions can be used by application developers. In practice, however, most applications do not do this.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to one aspect, there is provided a method for controlling processing of commands at a graphics processor comprising:
receiving input data and generating a command for processing at the graphics processor from the input data, wherein the command will cause the graphics processor to write out at least one buffer of data to an external memory; submitting the command to a queue for later processing at the graphics processor;
subsequent to submitting the command, but before the write to external memory has been completed, receiving further input data and determining that the buffer of data does not need to be written to external memory; and
signalling to the graphics processor to prevent at least a portion of the write to external memory from being performed for the command.

Determining that the buffer of data does not need to be written to external memory may comprise determining that subsequent commands will not use the buffer of data stored at the external memory. Determining that subsequent commands will not use the buffer of data stored at the external memory may comprise determining that the further input data does not request access to the buffer of data prior to the buffer of data being cleared or invalidated.

Determining that the further input data does not request access to the buffer of data prior to the buffer of data being cleared or invalidated may comprise: maintaining a data structure to track access requests to the buffer of data received in the further input data; and analysing the data structure when a function to clear or invalidate the buffer of data is received to determine whether a prior access request was made. Maintaining the data structure may comprise storing an identifier identifying the buffer of data and the command against a flag indicating whether an access request has been received. Maintaining the data structure to track access requests may comprise determining whether an application-level or driver-level access request is received for the buffer of data.

Determining that there is no access request may comprise tracking accesses to the buffer of data to be written at an application or driver layer in a system hierarchy.

Determining that the buffer of data does not need to be written to external memory may comprise determining whether there is one or both of an implicit invalidation of the data and an explicit invalidation of the data. The method may comprise determining at a driver layer that the data to be written is to be invalidated.

The command may comprise at least one configuration register setting that will cause the graphics processor to write out the at least one buffer of data to the external memory. Signalling to the graphics processor to prevent at least a portion of the write to external memory from being performed for the command may comprise modifying the register setting in the command or at the graphics processor.

Signalling to the graphics processor to prevent at least a portion of the write to external memory from being performed for the command may comprise signalling to the queue to modify the command held in the queue, such that the command will not cause the graphics processor to write out at least one buffer of data to the external memory. The method may comprise, responsive to the signalling, searching the queue for the command and modifying the command.

Signalling to the graphics processor to prevent at least a portion of the write to external memory from being performed for the command may comprise signalling to the graphics processor to modify the command prior to being processed, such that the command will not cause the graphics processor to write out at least one buffer of data to the external memory. The method may comprise, responsive to the signalling, storing an identifier for the command and at least one buffer of data and modifying the command responsive to determining that the command received from the queue to be processed has a matching identifier.

Signalling to the graphics processor to prevent at least a portion of the write to external memory from being performed for the command may comprise signalling to the graphics processor to modify the command while the command is being processed, such that the command will not cause the graphics processor to write out at least a portion of the at least one buffer of data to the external memory.

The command may comprise a pointer to a location in the external memory which comprises set-up data that will cause the graphics processor to write out the at least one buffer of data to the external memory. Signalling to the graphics processor to prevent at least a portion of the write to external memory from being performed for the command may comprise modifying the set-up data.

Signalling to the graphics processor to prevent at least a portion of the write to external memory from being performed for the command may comprise generating an interrupt signal to cause the graphics processor to stop processing the command.

The command may comprise at least one pointer to graphics data stored in the external memory.

The queue may be a command queue configured to store commands at the graphics processor until they can be processed at the graphics processor.

The at least one buffer of data may comprise at least one of a depth buffer, a stencil buffer and a colour buffer.

The command may be processed at a firmware or hardware layer in a system hierarchy.

Generating the command may be performed at a higher level in a system hierarchy than the level at which the command is processed. Generating the command may be performed at a driver layer in a system hierarchy.

The input data may comprise a plurality of application programming interface function calls. The further input data may comprise a plurality of application programming interface function calls comprising at least one of: a clear function configured to cause the buffer of data stored in the external memory to be cleared; and an invalidate function configured to cause the buffer of data stored in the external memory to be invalidated.

The buffer of data to be written to the memory may be associated with a memory attachment to an object.

The input data may relate to a first render to be performed by the graphics processor, and the further input data may relate to a second render to be performed by the graphics processor.

A task to be executed may comprise the write of the data buffer and at least one other operation, wherein preventing at least a portion of the write to external memory from being performed for the command comprises preventing the graphics processor from completing the execution of the at least one other operation.

According to another aspect, there is provided, a system for controlling processing of commands at a graphics processor, the system comprising a driver operable to communicate with the graphics processor, the driver being configured to:
  receive input data and generate a command for processing at the graphics processor from the input data, wherein the command will cause the graphics processor to write out at least one buffer of data to an external memory;
  submit the command to a queue for later processing at the graphics processor;
  receive further input data and determine that the buffer of data does not need to be written to external memory; and
  signal to the graphics processor to prevent at least a portion of the write to external memory from being performed for the command.

The driver may be configured to determine that the buffer of data does not need to be written to external memory by being configured to determine that subsequent commands will not use the buffer of data stored at the external memory. The driver may be configured to determine that subsequent commands will not use the buffer of data stored at the external memory by being configured to determine that the further input data does not request access to the buffer of data prior to the buffer of data being cleared or invalidated.

The driver may further comprise a data structure, and the driver may be configured to determine that the further input data does not request access to the buffer of data prior to the buffer of data being cleared or invalidated by being configured to: maintain the data structure to track access requests to the buffer of data received in the further input data; and analyse the data structure when a function to clear or invalidate the buffer of data is received to determine whether a prior access request was made. The data structure may comprise an identifier identifying the buffer of data and the command against a flag indicating whether an access request has been received. The driver may be configured to maintain the data structure to track access requests by determining whether an application-level or driver-level access request is received for the buffer of data.

The driver may be configured to track accesses to the buffer of data to be written at an application or driver layer in system hierarchy to determine that there is no access request.

The driver may be configured to determine that the buffer of data does not need to be written to external memory by being configured to determine whether there is one or both of an implicit invalidation of the data and an explicit invalidation of the data.

The command may comprise at least one configuration register setting that will cause the graphics processor to write out the at least one buffer of data to the external memory. The driver may be configured to signal to the graphics processor to prevent at least a portion of the write to external memory from being performed for the command by modifying the register setting in the command or at the graphics processor.

The driver may be configured to signal to the graphics processor to prevent at least a portion of the write to external memory from being performed for the command by being configured to signal to the queue to modify the command held in the queue, such that the command will not cause the graphics processor to write out at least one buffer of data to the external memory. The system may further comprise the queue, wherein the queue is configured to, responsive to the signal, search for the command and modify the command.

The driver may be configured to signal to the graphics processor to prevent at least a portion of the write to external memory from being performed for the command by being configured to signal to the graphics processor to modify the command prior to being processed, such that the command will not cause the graphics processor to write out at least one buffer of data to the external memory. The system may further comprise a command processor, wherein the command processor may be configured, responsive to the signal, to store an identifier for the command and at least one buffer of data and modify the command responsive to determining that the command received from the queue to be processed has a matching identifier.

The driver may be configured to signal to the graphics processor to prevent at least a portion of the write to external memory from being performed for the command by being configured to signal to the graphics processor to modify the command while the command is being processed, such that the command will not cause the graphics processor to write out at least a portion of the at least one buffer of data to the external memory.

The command may comprise a pointer to a location in the external memory which comprises set-up data that will cause the graphics processor to write out the at least one buffer of data to the external memory. The driver may be configured to signal to the graphics processor to prevent at least a portion of the write to external memory from being performed for the command by modifying the set-up data.

The driver may be configured to signal to the graphics processor to prevent at least a portion of the write to external memory from being performed for the command by being configured to generate an interrupt signal to cause the graphics processor to stop processing the command.

The command may comprise at least one pointer to graphics data stored in the external memory.

The queue may be a command queue configured to store commands at the graphics processor until they can be processed at the graphics processor.

The at least one buffer of data may comprise at least one of a depth buffer, a stencil buffer and a colour buffer.

The command may be processed at a firmware or hardware layer in a system hierarchy.

The driver may be configured to operate at a higher level in a system hierarchy than the level at which the command is processed.

The input data may comprise a plurality of application programming interface function calls. The further input data may comprise a plurality of application programming interface function calls comprising at least one of: a clear function configured to cause the buffer of data stored in the external memory to be cleared; and an invalidate function configured to cause the buffer of data stored in the external memory to be invalidated.

The buffer of data to be written to the memory may be associated with a memory attachment to an object.

The input data may relate to a first render to be performed by the graphics processor, and the further input data may relate to a second render to be performed by the graphics processor.

A task to be executed may comprise the write of the data buffer and at least one other operation, wherein the driver may be configured to prevent at least a portion of the write to external memory from being performed for the command by preventing the graphics processor from completing the execution of the at least one other operation.

According to another aspect, there is provided a system configured to perform the method as described herein.

According to another aspect, there is provided a system as described herein, wherein the system is embodied in hardware on an integrated circuit.

According to another aspect, there is provided a method of manufacturing, using an integrated circuit manufacturing system, a system as described herein.

According to another aspect, there is provided a method of manufacturing, using an integrated circuit manufacturing system, a system as described herein, the method comprising:
processing, using a layout processing system, a computer readable description of the graphics processing system so as to generate a circuit layout description of an integrated circuit embodying the system; and
manufacturing, using an integrated circuit generation system, the system according to the circuit layout description.

According to another aspect, there is provided computer program code for performing a method as described herein.

According to another aspect, there is provided a non-transitory computer readable storage medium having stored thereon computer readable instructions that, when executed at a computer system, cause the computer system to perform the method as described herein.

According to another aspect, there is provided an integrated circuit definition dataset that, when processed in an integrated circuit manufacturing system, configures the integrated circuit manufacturing system to manufacture a system as described herein.

According to another aspect, there is provided a non-transitory computer readable storage medium having stored thereon a computer readable description of a system as described herein that, when processed in an integrated circuit manufacturing system, causes the integrated circuit manufacturing system to manufacture an integrated circuit embodying the system.

According to another aspect, there is provided a computer readable storage medium having stored thereon a computer readable description of a system as described herein which, when processed in an integrated circuit manufacturing system, causes the integrated circuit manufacturing system to:
process, using a layout processing system, the computer readable description of the apparatus so as to generate a circuit layout description of an integrated circuit embodying the system; and
manufacture, using an integrated circuit generation system, the system according to the circuit layout description.

According to another aspect, there is provided an integrated circuit manufacturing system configured to manufacture a system as described herein.

According to another aspect, there is provided an integrated circuit manufacturing system comprising:
a non-transitory computer readable storage medium having stored thereon a computer readable description of a system as described herein;
a layout processing system configured to process the computer readable description so as to generate a circuit layout description of an integrated circuit embodying the system; and
an integrated circuit generation system configured to manufacture the system according to the circuit layout description.

BRIEF DESCRIPTION OF THE DRAWINGS

The present invention is described by way of example with reference to the accompanying drawings. In the drawings.

DETAILED DESCRIPTION

Figure 1:
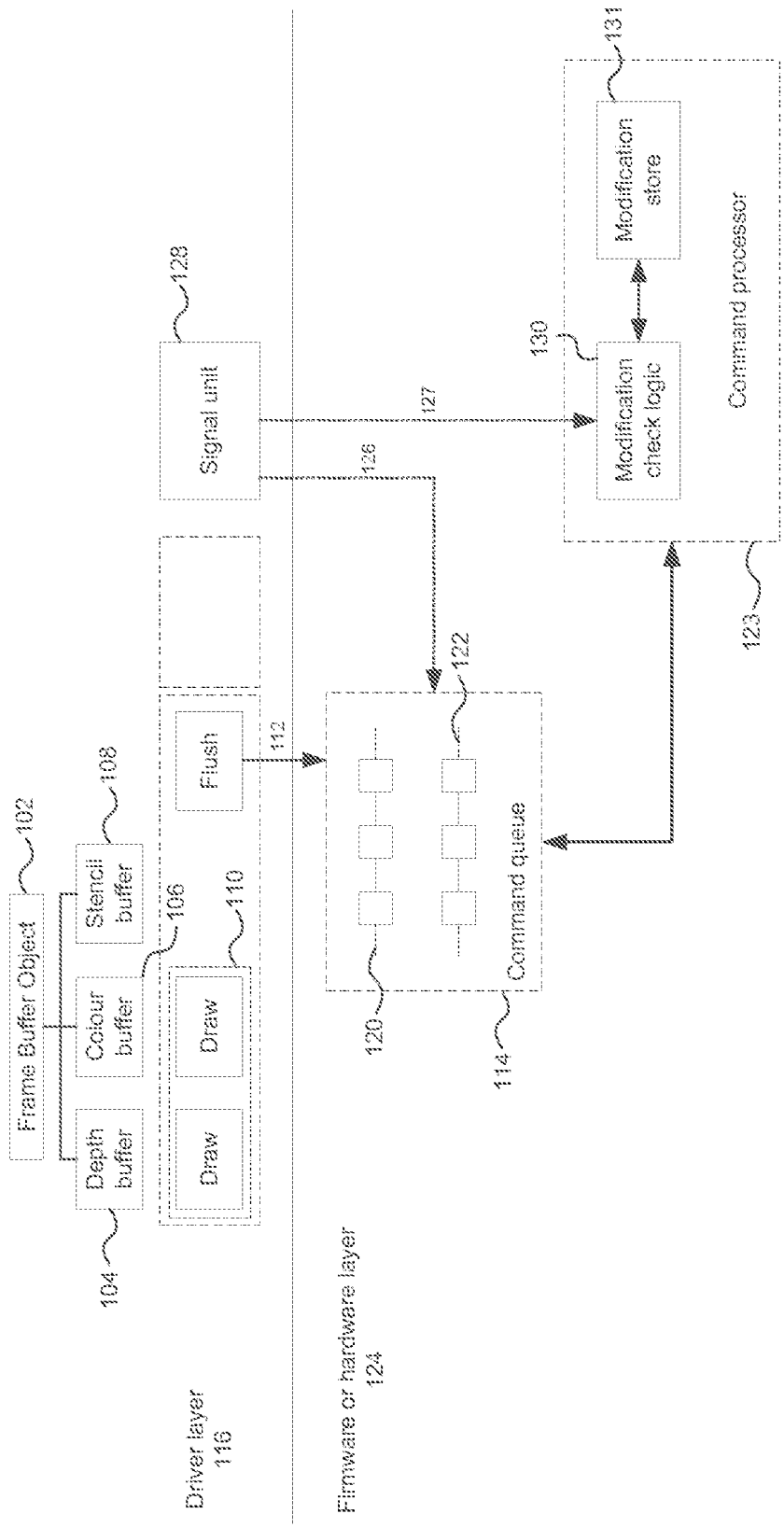
FIG. 1 shows a schematic illustration of a system for processing commands.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The following examples describe apparatus, systems and methods in which write operations in respect of data can be avoided. The apparatus, systems and methods can however be used in any situation where locally-stored data is to be written out to an external memory by a processor under the control of a driver or other higher-level management layer.

The techniques disclosed herein are relevant for processing in a processing system, such as at a graphics processor. For example, the techniques may be relevant to the processing of computer commands, such as commands for controlling the operation of a GPU. Data to be processed can comprise graphics, audio, image (including video) and/or numerical data. For example, a data stream can comprise one or more frames of graphics data, audio data, image data, or a combination of the foregoing. The examples below will describe the techniques in the context of graphics processing, for ease of understanding. The techniques are however more generally applicable, as would be understood by the skilled person.

In a graphics processing system, graphics data is input to a processor, and a rendering operation can be carried out on that graphics data. There are several ways in which this rendering operation can be carried out. One example is immediate mode rendering, where primitives are rendered to a frame buffer as soon as they are processed by the processor.

Another example is tile-based rendering, where the rendering space (e.g. the screen) is divided into a plurality of tiles, and the rendering process is carried out for a tile at a time, or a group of tiles at a time. The rendering mode used is not critical to the techniques discussed herein, as will be apparent from the following discussion. A brief overview of a rendering process is provided for context.

In a render, graphics data is processed. The graphics data can comprise vertex data associated with the vertices of one or more primitives, such as triangles, that can be used to represent objects in a scene such as a 3D scene. Each vertex of a primitive has coordinates indicating its 3D position in the scene, and hence depth data can be calculated across the surface of the primitive for a set of sample points (e.g. corresponding to pixels or sub-pixel samples) covered by the primitive. The depth data indicates the depth in the scene of those primitive sample points from a view point, e.g. a camera location in the scene. This depth data relates to the distance from the view point to that primitive. Based on this depth information, it can be determined whether a primitive is visible. For example, the primitive may be behind another primitive (in whole or in part). Where the primitive is not visible, that primitive need not be rendered. The depth values of the primitive at the sample points are usefully processed using a Z (or depth) buffer. For example, the Z or depth buffer may be a (logically) two-dimensional array of values representing the depth of visible primitives (e.g. the closest primitive to the view point) at the sample points, such as at each pixel of a tile or the screen. This enables hidden surface removal (HSR) to be performed.

Once a primitive has been processed, including determining whether it is visible in screen-space (i.e. in the projection to a screen of the 3D scene), a colour value can be output for each sample point (e.g. pixel) covered by that primitive. The colour value can be stored in a colour buffer. The colour buffer may be a (logically) two-dimensional array of values representing the colour of visible primitives at the sample points, such as at each pixel of a tile or the screen. A later-processed primitive may be found to obscure the earlier-processed primitive. Colour values for the pixels corresponding to the later-processed primitive can then be updated in the colour buffer (either overwritten where the later-processed primitive is opaque, or blended with the earlier value where the later-processed primitive is partially transparent).

Furthermore, a stencil buffer may be provided which is able to store per-sample information for a tile or the screen. The stencil buffer may be used to modify or control the rendering in the tile or on the screen. For example the stencil buffer may define sample points that will or will not be rendered (stenciling) or it may be used to define a transparent portion of an object (such as a window). More generally, the stencil buffer may be a (logically) two-dimensional array of values for use with rendering primitives at the sample points, such as at each pixel of a tile or the screen. The data in the stencil buffer may be modified during a render as the primitives are processed.

Thus, it is useful in the render to make use of at least one of a depth buffer, a colour buffer and a stencil buffer. Referring to FIG. 1, at the application/API level, the depth 104, colour 106 and/or stencil buffers 108 may be logical attachments to an object (which may be a software object) such as a frame buffer object 102. The term "attachment" is used here to denote an association between objects defined in a software layer, such as a graphics API. Each attachment is suitably a memory attachment. For example, in OpenGL®, the depth buffer can be a GL_DEPTH_ATTACHMENT, the colour buffer can be a GL_COLOR_ATTACHMENT, and/or the stencil buffer can be a GL_STENCIL_ATTACHMENT. Each attachment is suitably backed by areas in physical memory allocated to the respective attachment.

During the processing of a render on a GPU, the physical memory allocated to the frame buffer object attachments may be a local memory. The local memory may be on-chip, e.g. on a processor, such as in RAMs or registers within the processor structure. In this way, fast processing using the frame buffer object attachments (i.e. the depth, colour and/or stencil buffers) can be achieved. As an example, fast depth-testing can be carried out based on the depth values associated with a primitive being processed, and the values stored in the depth buffer.

At some stage the processing using the frame buffer object attachment 104, 106, 108 will finish. This might be because it is desired to free up memory space for further processing. This might additionally or alternatively be because the processing of a frame, a number of frames, a partial render or a render has completed. Typically, the outputs of the on-chip processing are used in a render (or a portion of a render), with subsequent outputs being used in subsequent renders (or further portions of the same render). At this stage, the memory content of the local memory allocated to the frame buffer object attachment, such as the depth buffer 104, can be written to external memory. Writing out the memory content in this way preserves the memory content in case it is later needed. For example, considering the depth buffer, a portion of a frame may be processed and the content of the depth buffer for that portion of the frame may be written to external memory. A later-processed primitive may overlap with a primitive processed in the earlier portion of the frame. It will therefore be useful to perform depth testing on the depth values that were previously in the depth buffer, i.e. the data that were previously written to the external memory. Additionally or alternatively, some applications expect to see a depth buffer saved following a render, so it is often appropriate to write out the depth buffer in case it is needed.

Typically, when a render is submitted from the API/driver level that comprises a memory attachment to a frame buffer object that will be written to external memory, it is not known whether that data will later be needed, i.e. whether the data will be read subsequently.

In a simple example, consider a graphics processing task comprising two groups of primitives: group A and group B. Group A is initially processed, and the depth buffer 104, colour buffer 106 and stencil buffer 108 (as appropriate) are populated with data values, as outlined below. The first stage of processing the primitives in group A may be performed by a driver program (at least partially executing on a host CPU). The driver program prepares the data required for rendering the primitives in group A and one result of this is the generation of at least one command 110 for controlling the GPU to render these primitives. For example, the command may relate to one or more draw calls, for drawing one or more primitives of the primitives in group A. The command may comprise set-up information (e.g. configuration register values) and state data for controlling the GPU to perform the desired rendering operation. The command submitted to the command queue may also include a pointer to where associated graphics data is stored in external memory, for example where the graphics data relating to the group A primitives is held, so that the GPU can access the primitive data when performing the render. The graphics data relating to the group A primitives may comprise the vertex data and one or more shader programs to be executed on the vertices by the GPU. In one example, the command may comprise at least one configuration register value that instructs the GPU to write out one more of the depth buffer, colour buffer and stencil buffer during or after a render. In another example, the graphics data stored in external memory pointed to by the command may include an instruction or set-up data that instructs the GPU to write out one or more of the depth buffer, colour buffer and stencil buffer during or after a render.

In alternative examples, instead of the command including GPU set-up information and state data, the command can include instructions that tell the GPU how to operate. These instructions can then be interpreted at the GPU and used to control the low-level operations of the GPU to perform the rendering operation. The instructions contained in the command may include an instruction to cause the GPU to write out one more of the depth buffer, colour buffer and stencil buffer during or after a render.

When, for example, the generation of the command for a particular render or partial render has been completed by the driver, the initiation of the render on the GPU can be triggered (this may be referred to as the render being "kicked"), whereby the command, and associated data, is flushed 112 to a command queue 114.

In this example, since it is not known at this stage whether the data content of any of the depth, colour and/or stencil buffers are needed later in the rendering process, the command will cause the GPU to perform a write operation to cause the data from the depth buffer (for example) to be written to external memory. The external memory is typically off-chip memory, for example in the form of DRAM or flash memory that is connected to the processor, but not an integral part of its structure. In some examples, the buffer contents may be written to external memory at the end of the render, but may also be written to external memory part-way through the render. Similar write operations in respect of the colour buffer and stencil buffer may additionally or alternatively be caused to occur as a result of the command, but for the purposes of illustrating the present techniques, it is sufficient to consider only one of these buffers. The depth buffer is taken as an example here.

In this example, the initial processing of an input data stream (i.e. the processing of a first portion of the data stream corresponding to primitives in group A) can occur at a driver layer 116 in a processor, such as a central processing unit (CPU). For example, a client driver, such as a driver configured to interpret API functions such as OpenGL® for Embedded Systems (OpenGL® ES), can control the initial processing. The commands can be flushed to a layer in system hierarchy that is lower than the driver layer. For example, the commands can be flushed to a lower layer (denoted the firmware or hardware layer 124 herein) which may be implemented in either the GPU or the CPU, or a combination thereof. The firmware or hardware layer 124 can comprise the command queue 114. The command queue can comprise a buffer, such as a First In, First Out (FIFO) buffer for storing the commands in the command queue. In this way, the commands in the FIFO buffer can be processed in the order in which they were submitted by the driver layer to the firmware or hardware layer. The command queue buffer may be implemented in hardware within the GPU in one example. The command queue can comprise a geometry command queue 120 and a pixel processing command queue 122. The geometry command queue is suitably for storing geometry processing commands. The geometry command queue may form part of a tile accelerator at the GPU in some examples. The pixel processing command queue is suitably for storing pixel processing commands such as 3D commands and may form part of a pixel processing pipeline at the GPU in some examples.

In some examples, the driver may be configured to generate the command by collating or batching high-level commands (e.g. API functions) into a packet of work suitable for processing at a lower level in system hierarchy (e.g. a GPU-specific command). For example, API calls or functions received at the driver requesting a particular graphics operation to be performed can be processed by the driver to generate the GPU command (including the set-up/ register data and pointers to related data) to enact the operations requested in those API calls or functions. In an alternative example, the API calls or functions received at the driver may be interpreted/compiled into GPU instructions and included in the command. The command submitted to the command queue is suitable for reading and/or processing at the hardware or firmware layer 124. For example, the command can be processed by one or more command processors 123, at the hardware or firmware layer 124.

As mentioned above, in this example, the command queue comprises a command that will cause the GPU to write data from the depth buffer to external (off-chip) memory. For example, the command queue at the firmware or hardware layer 124 will comprise a command that includes a GPU register value that will control the GPU to perform the write operation. In some examples, commands on the command queue comprise one or more command packets. The command packets can comprise metadata associated with the respective command.

In one example, the commands in the command queue are processed in the order in which they were submitted to the command queue. Thus the command processor 123 at the hardware or firmware layer 124 will execute the commands in the order in which the commands were flushed 112 to the command queue 114. In another example, a scheduler may be implemented at the hardware or firmware layer 124 to analyse the contents of the command queue and determine which command will be executed next. As such, the commands may be executed by the GPU in a different order than they were submitted to the command queue.

Once the commands have been flushed to the command queue, the processing of these commands (e.g. the execution on the GPU of the operations instructed by these commands) will occur whilst the driver layer 116 continues the processing of the input data stream (e.g. a second portion of the data stream, corresponding to the primitives of group B).

There are two main situations to consider in this example. In the first situation, the rendering of the primitives of group B makes use of at least one of the depth buffer, colour buffer and stencil buffer generated in the rendering of group A as an input. For example, the rendering of group B may utilise the colour buffer as part of a texture to apply to the group B primitives, or utilise the depth buffer when calculating the lighting of the group B primitives. As mentioned previously, the command submitted for the rendering of group A caused the GPU to write out the locally stored buffers to external memory. These saved buffers can therefore be utilised successfully in the rendering of group B.

In this situation, there is a memory bandwidth cost associated with the write to external memory of the depth, colour and/or stencil buffer data when rendering group A. However, since that data is later accessed when rendering group B, the write is necessary.

In an alternative situation, the rendering of the group B primitives does not utilise the buffers written to external memory when rendering the group A primitives. For example, the depth data associated with the group A primitives (i.e. data that the group A command will cause to be written to external memory) is not needed when processing the group B primitives. This particular example also assumes that no further renders are performed after group B that require the use of the group A buffers.

In contrast to the first situation, since the group A depth buffer data is not subsequently accessed, the memory bandwidth of the associated write operation is wasted. In some situations the unnecessarily-written data could typically be in the order of 8 MB of data for a render.

The present inventors have appreciated that there is a latency between submitting a command from the driver, and the execution on the GPU of operations caused by that command. With reference to the system described above, and illustrated in FIG. 1, frames of graphics data are processed at the driver layer 116, resulting in commands for one or more renders being flushed to a firmware or hardware layer 124. Here, commands are placed in a command queue. One or more command processors 123 at a hardware or firmware layer 124 of the GPU receives commands from the command queue (in order of their submission in some examples), and processes the commands to initiate the execution of operations corresponding to those commands. The start of the execution of the operations on the GPU may be one or more frames behind the processing of the API calls/functions at the driver layer. It has been found that the execution of the operations at the GPU is typically 2 to 3 frames behind the processing of the API calls/functions at the driver layer. There is therefore a delay between the submission of work (which might be 3D work in a graphics processing system) by a client driver, and the firmware starting the processing on the hardware.

As mentioned, the client driver may be several frames ahead of the hardware. Since the processing of each frame may result in multiple different renders, this means that the client driver may be up to approximately 20 renders ahead of the hardware in some examples.

Before the GPU hardware starts the processing of a command in respect of a given render, frame, or portion of a frame, the client driver may have become aware of additional information in respect of that command. For example, the client driver may know that buffer data is not used in the processing of a later render or portion of a frame and/or the client driver may know that a buffer is cleared at the start of the next frame without it being accessed in the meantime. This knowledge can be used to prevent the writing of the buffer data to external memory. The prevention of the writing of the buffer data may occur mid-way through the processing of that render, or at the end of that render. Disabling the store of the buffer data if the firmware has not started processing the original command can therefore result in a significant memory bandwidth saving. In an example wherein the order of 8 MB of data per render can be written by a write command, this approach can permit savings of up to 8 MB of data bandwidth per render. There may be multiple renders per frame, resulting in an even higher saving in memory bandwidth and power consumption for the overall frame.

The driver can know that buffer data is not used in the processing of a later render by detecting whether the buffer data is cleared or invalidated at the API level, without having been used by intervening API functions. For example, when the driver starts to process API functions for a new frame or render, this will often begin with an API call to 'clear' the buffers. This clear function indicates that all the data in the buffers should be discarded (as new data will be generated for the new frame/render). The driver therefore knows that the existing buffers will not be accessed from this point onwards. As a result, a write operation that would be performed by a render preceding the new frame/render will be unnecessary. This can be viewed as an implicit invalidation of the buffer data. In another example, the driver may receive an explicit invalidation of the buffers in the form an 'invalidation' function being called at the API. An example of such a function is glInvalidateFrameBuffer( ) in OpenGL®. This API function tells the driver to invalidate the data in the frame buffer (e.g. delete or mark the data for deletion/replacement). Such a function may be received at the driver part-way through the processing of a frame. Again, this enables the driver to know that the existing buffers will not be accessed from this point onwards, and a write operation that would be performed by a render preceding the invalidation will be unnecessary.

The driver may also be configured to track accesses to the frame buffer objects at the API level. For example, the driver may maintain a data structure that indicates whether, for a given identified render, any API level accesses to the buffer data have been requested. In other words, the driver can maintain a data structure to track access requests to a given buffer of data received in further input data. This enables the driver to track back several renders into the past once an (implicit or explicit) invalidation is received, and potentially avoid write operations being performed by several renders that have been submitted to the GPU but not yet executed. The driver can be configured to analyse the data structure when a function to clear or invalidate the buffer of data is received to determine whether a prior access request was made. The data structure may comprise an identifier identifying a command (e.g. a render) and a particular buffer of data (e.g. the depth buffer for that render) against a flag (or other data such as a count) indicating whether one or more access request has been received for that buffer.

Referring again to FIG. 1, a signal 126 127 can be output for immediate processing (i.e. it is not queued) which can modify the commands on or leaving the command queue. As illustrated, the signal 126 127 can be output by the driver, but this is not necessary in all examples. In some examples, the signal may be output by a signal unit 128 at the driver layer. The signal 126 127 does not get processed in the same manner as the commands in the command queue. Suitably the signal is processed immediately, or as soon as practical. The signal 126 may be sent from the driver layer, for example from the signal unit 128, to the command queue 114.

Consider the group A and group B primitives example above. In this example, the driver processes the group A primitives and outputs a command to the command queue. When processing the group B primitives, the driver knows that the depth buffer data for the group A primitives is not used when processing the group B primitives. The driver can make this determination by, for example, determining that there is no API access in respect of the depth buffer data (i.e. the data subject to the write command). At the start of a subsequent frame (or more generally, when continuing the processing of the graphics data), the driver can determine that there is an invalidation in respect of the depth buffer (e.g. a 'clear' call at the start of the next frame). Thus, the driver can determine that the depth buffer data to be stored on execution of the group A rendering command will not be accessed before it is invalidated, and that therefore the write is not needed.

In response, the driver can output a signal that will modify the associated command (before it is initiated) to prevent the execution of the write operation by the GPU. The signal may be a signal from the driver which comprises a render identifier and an indication of how to modify the associated command. The render identifier may be an identifier of the render to which the associated command relates. The indication of how to modify the associated command may comprise an indication of a write operation that is to be prevented, for example a write operation in respect of one or more of the depth buffer, the colour buffer and the stencil buffer. For example, the signal may comprise an indication that causes the prevention of a write operation in respect of the depth buffer, for a particular render identifier.

The command which would otherwise cause execution of the write operation can be modified in one of several ways. In some examples, the command can be modified as it leaves the command queue. In some examples, the command can be modified before it leaves the command queue.

In some examples, modification check logic 130 may be implemented at the GPU. The modification check logic may be provided in firmware or hardware. The modification check logic may be configured to receive the signal 127 from the driver layer, for example from the signal unit 128. The modification check logic may be configured to store received signals. The received signals may be stored at a modification store 131 accessible to the modification check logic. For example, the modification store may be provided at the firmware or hardware layer 124. One or both of the modification check logic 130 and the modification store 131 may be implemented as part of the command processor 123, so that they are readily able to inspect commands that leave the command queue. The modification check logic may have access to the command queue. The modification check logic may access commands in the command queue, for example a command that is coming off the command queue (for example the next command to issue from a FIFO-implemented command queue, or a command selected as the next command to issue by a scheduler), and may determine whether a signal has been received that relates to that command. The modification check logic may make this determination, for example, in dependence on the render identifier. For example, the modification check logic may be configured to check the command queue for commands which have (or relate to) render identifiers for which signals have been received.

Where the modification check logic determines a match, i.e. that there is a command on the command queue which relates to a received signal, the modification check logic may be configured to modify the configuration register values in the command, or associated with the command, before that command is read and processed by the GPU hardware. For example, the modification check logic can modify the configuration register values in response to the indication in the signal of how to modify the associated command. For example, the modification check logic can modify commands as they leave the command queue, but before execution of any write operation which would otherwise be caused by those commands.

A configuration register value, in a command or associated with a command, may be configured to cause a write operation to be performed. The command may comprise a pointer to a register at which the configuration register value is stored. The configuration register value need not form part of the command itself. In some examples, the GPU may be configured to cause execution of a write operation in response to reading a register value of '1'.

The modification check logic may cause, where a write operation is to be prevented, the corresponding configuration register value (for example in the command or at a register) to be changed, for example from '1' to '0'. In some examples, where the register value is '0', the GPU may be configured such that an operation corresponding to that register value is not performed.

Modification of a command may be implemented at a higher layer in the system than at the firmware or hardware layer, for example at the driver layer. The driver may be configured to send a signal to the firmware or hardware layer indicating that a particular render should not cause data from one or more buffer to be subject to a write operation. The signal sent by the driver may comprise a render identifier, identifying the render to which the command to be modified relates. The signal sent by the driver may comprise an indication of how to modify the command. In response to receiving the signal from the driver layer, the firmware or hardware layer may be configured to determine whether a command in the command queue relates to the render identifier, for example whether a command in the command queue comprises the render identifier. Where it is determined that there is a command relating to the render identifier of the received signal, the firmware or hardware layer may change one or more configuration register value corresponding to that command (such as from '1' to '0'), for example so as to prevent execution of a write operation associated with that command. In this approach, commands are modified before they leave the queue.

In some examples, it is not necessary to modify the command. The signal unit may be configured to send a signal to hardware at the GPU. The signal may cause the GPU to change its configuration registers, for example one or more configuration register values associated with a write operation corresponding to a particular command (or a particular render), after that particular command has been loaded for processing, such as at one or more command processor. For example, the GPU may be configured, in response to receiving the signal, to change at least one configuration register value from '1' (which may indicate that an operation is to be performed) to '0' (which may indicate that an operation is not to be performed).

This approach enables the write operation to be prevented from executing even if the command has already been loaded for processing. This approach, of changing configuration registers at the GPU, may be used to implement a modification of a write operation part-way through a render. For example, in a tile-based rendering system, a render may involve executing a write operation in respect of a plurality of tiles during a render. The driver may be configured to determine that at least some of the write operations are not necessary, and to issue a signal to hardware at the GPU to prevent the write operations (or further write operations) from being performed. Where such a signal is received by the hardware at the GPU part-way through a render, a write operation in respect of one or more tiles may already have been performed. However, it is possible to prevent the execution of one or more other write operations in respect of one or more other tiles. Whilst some unnecessary writes, in respect of some tiles, may have occurred, the prevention of further unnecessary write operations can result in memory bandwidth and power consumption savings.

Preventing the completion of the execution of the write operation (such as by modifying the command to change the GPU operation so that the write process is not initiated), can lead to savings in the memory bandwidth and power consumed that would otherwise have been used in writing the data to the external memory. In some situations this can be a significant proportion of the total write bandwidth of a frame and/or render. For example, in some applications, the size of the depth buffer and the size of the colour buffer may be approximately the same. Typically, each of the depth and colour buffers may be written once per render. The present inventors have found that, in practice, the depth buffer need not be written out to external memory for most renders. This means that the write operation associated with writing the depth buffer out to memory can be omitted for such renders. This can therefore lead to savings of approximately half of the total write bandwidth otherwise required.

Whilst FIG. 1 illustrates the driver layer as outputting the signal 126 127, this is not necessary in all examples. For instance, the signal 126 127 can be generated by any software or hardware unit that has access to the input data at a time that is ahead of the corresponding execution on the GPU.

Figure 2:
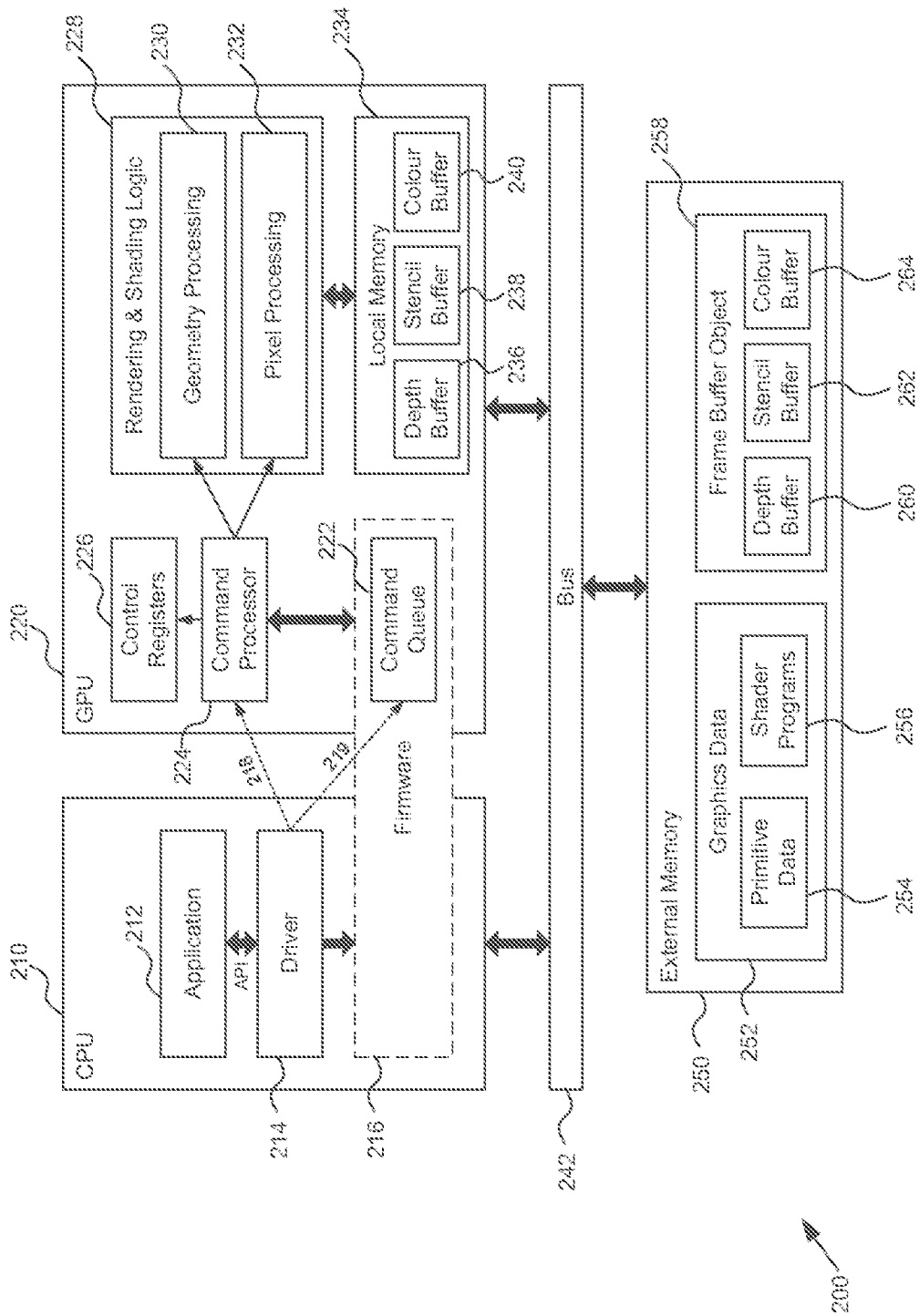
FIG. 2 shows a schematic diagram of a graphics system.

Reference is now made to FIG. 2, showing a schematic diagram of a graphics system 200. The system 200 may be implemented on a device, such as a smart phone, tablet, laptop, Personal Computer (PC), television, or any other appropriate device in which graphics data is to be processed. The graphics system 200 may be a tile-based graphics system. Data, such as graphics data, may be provided, e.g. from an application. The graphics system is configured to process the data and provide an output of processed data. The system 200 comprises a general purpose processor 210 and a graphics processor 220. The general purpose processor and graphics processor are configured to process the data. The graphics processor 220 may be at least partially implemented in hardware or software, or a combination thereof. For example, the graphics processor 220 may be implemented in fixed-function hardware comprising circuits configured to process data accordingly as described herein. For example, the graphics processor 220 may be a graphics processing unit (GPU), or may be implemented as a computer program running on a programmable device such as a CPU.

The general purpose processor 210 comprises a plurality of functional blocks for processing data, wherein some (but, for clarity, not all) of the functional blocks of the general purpose processor 210 are shown in FIG. 2. The general purpose processor 210 may be implemented in hardware or software, or a combination thereof. For example, the general purpose processor 210 may be implemented in fixed-function hardware comprising circuits configured to process data accordingly as described herein. For example, the general purpose processor 210 may be a CPU, or may be implemented as a computer program running on a programmable device such as a CPU. The general purpose processor 210 comprises an application 212, for example at an application layer at the processor. The application is configured to communicate with a driver 214 at a driver layer, for example by way of an API. The general purpose processor may also comprise (or be communicatively coupled to) a command queue 222 implemented at a hardware or firmware layer. For example, the command queue 222 may be implemented in firmware 216. As illustrated in FIG. 2, the general purpose processor 210 and the graphics processor 220 both have access to firmware 216 implementing the command queue 222. The command queue may be implemented as a buffer, for example a FIFO buffer. The driver 214 is configured to communicate with the hardware or firmware layer. For example, the driver 214 is configured to communicate with the firmware 216. The driver is suitably configured to communicate with the command queue 222. The application 212 may be implemented as a software unit or module running at the general purpose processor 210. The driver 214 may be implemented as a software unit or module running at the general purpose processor 210, for example a unit running in accordance with driver software.

The graphics processor 220 comprises a plurality of functional blocks for processing data, wherein some (but, for clarity, not all) of the functional blocks of the graphics processor 220 are shown in FIG. 2. The graphics processor 220 may comprise a command queue 222 implemented at a hardware or firmware layer. For example, the command queue may be implemented in firmware 216. The command queue may be implemented as a buffer, for example a FIFO buffer. The graphics processor 220 comprises one or more command processor (one such command processor is illustrated in FIG. 2 at 224). The command processor 224 is configured to communicate with the hardware or firmware layer. For example, the command processor 224 is configured to communicate with the firmware 216.

The command processor is suitably configured to communicate with the command queue 222. The command processor is also configured to communicate with control registers 226. The control registers are configured for storing values (for example configuration register values) associated with commands, such as commands on the command queue, that may be processed by the command processor. The values stored in the control registers may, for example, be used by the system to control the execution of operations such as write operations.

The graphics processor 220 comprises rendering and shading logic 228. The rendering and shading logic comprises geometry processing logic 230 and pixel processing logic 232. The geometry processing logic may be configured to execute geometry processing operations. The pixel processing logic may be configured to execute pixel processing operations. The rendering and shading logic is coupled to the command processor. The command processor may be coupled to one or both of the geometry processing logic and the pixel processing logic. For example, the command processor may cause one or both of the geometry processing logic and the pixel processing logic to commence execution of an operation. The rendering and shading logic is configured to communicate with a local memory 234. The local memory is configured to store depth data in a depth buffer 236, stencil data in a stencil buffer 238 and colour data in a colour buffer 240.

The general purpose processor 210 and the graphics processor 220 are configured to communicate with an external memory 250 via a bus 242. The external memory is configured for storing graphics data 252, such as primitive data 254 and shader programs 256. The external memory is configured for storing frame buffer object data 258, such as depth buffer data 260, stencil buffer data 262 and colour buffer data 264. Thus, when a write operation to external memory is performed, data may be written from one or more of the depth buffer 236, stencil buffer 238 and colour buffer 240 at the local memory 234 to a corresponding one or more of the depth buffer 260, stencil buffer 262 and colour buffer 264 at the external memory 250.

The system 200 may comprise a memory management unit (MMU) (not shown) configured to manage the memory resources of the external memory 250. The MMU may perform virtual memory management and translate virtual memory addresses to physical addresses. The MMU may be implemented as part of the general purpose processor 210 or as a separate hardware component or as a computer program. The external memory 250 may comprise a plurality of memory blocks for storing data. The external memory 250 may comprise respective memory blocks at which data from a frame buffer object's depth buffer, stencil buffer and colour buffer may be stored. The memory in the memory blocks may be allocated on demand. For example, memory can be allocated in one or more of the memory blocks from a pool of available memory. The memory is suitably allocated on a page-by-page basis. In some examples, a memory page is 4 KB in size. Other ways of allocating memory, and memory page sizes are possible. Memory of memory blocks can be allocated in response to processing a command, for example at the command processor. Memory of memory blocks can be allocated in response to issuing a write operation for execution, or in response to executing a write operation. Allocation of the memory blocks can be performed by the MMU.

Memory allocation may happen in different stages. For example, a block of virtual memory may be allocated to one or more of the depth buffer, the colour buffer and the stencil buffer, but physical memory "backing" may only be provided where it is needed. Alternatively, the system 200 can wait until the render occurs and data is to be written to a memory page in external memory, for example as commands issued from the command queue are processed and cause execution of a write operation the system can trap the access to that external memory page, and allocate the physical memory in external memory only at that point. The page of memory that would otherwise have been mapped can therefore remain available for other uses by the system.

According to some examples, the system may be configured to operate in the following manner. An application 212 at the general purpose processor 210 processes input data, such as input graphics data, and generates outputs. The graphics data may comprise geometry data defining graphics objects. Parameters describing the graphics data 252, or at least a portion of the graphics data, are stored in external memory 250. The outputs of the application may be in the form of high-level commands, such as API functions. For example, the high-level commands may include commands requesting one or more graphics operation to be performed. The application may be configured to communicate with a driver 214 via an API, so as to be able to pass application outputs to the driver. The driver 214 can, in response to the outputs generated by the application, generate one or more commands. Driver software at the driver 214 is configured to generate one or more commands in dependence on the processing of an input data stream, such as graphics data. The one or more commands can be generated by the driver by collating one or more of the high-level commands from the application. The commands generated by the driver may comprise commands for controlling the overall operation of a GPU. In some examples there may be one command for a particular render, or one command for a tiling phase of the render and another command for the pixel processing phase of the render. For example, the driver may issue commands to start geometry processing operations on particular data, to start pixel processing operations on particular data, and/or to start a compute operation on particular data. The one or more high-level commands can be gathered into a packet of work, which can be processed at lower levels in the system hierarchy.

The commands generated by the driver may comprise the set-up information needed to configure the GPU for the desired operations to be executed. The set-up information may take the form of one or more register bits. The commands generated by the driver may comprise a pointer to the location in memory where the vertex/primitive data is stored, for example pointing to the relevant portion of the graphics data 252.

On completion of the command generation by the driver, which may correspond to a render or partial render, the initiation of the render (or partial render) on the GPU can be triggered, such as in a 'flush' process. This can cause the command to be placed on the command queue 222.

The driver 214 may determine that the generated one or more command is to be flushed. Determining that the one or more commands is to be flushed can be based on one or more of:
  processing for a particular render or partial render having been completed,
  a predetermined number (including fractional numbers) of renders or frames of the input data having been processed,
  the one or more command reaching or exceeding a threshold number of commands,
  the one or more command reaching or exceeding a threshold amount of data,
  the one or more command being associated with an amount of data, such as command metadata, and the amount of the associated data reaching or exceeding a threshold amount of associated data, and/or
  a predetermined amount of input data having been processed so as to generate the one or more command (for example, where the input data is graphics data, the amount of input data may be characterised by the number of vertices, vertex attributes, primitives and so on in the processed input data)
since the start of processing, a previous flush operation and/or some other determined point in the processing operation. An example of a determined point in the processing operation at which it may be desirable to initiate the flush is where the driver predicts that no more input commands are likely to be generated. The driver may be configured to predict that no more input commands are likely to be generated in dependence on previous frames and/or renders, for example in dependence on the command generation history of previous frames and/or renders.

In some examples, the determination that the one or more command is to be flushed can be made at the end of the processing of a render (i.e. the number of renders having been processed since the previous flush is one) or where the one or more command reaches a predetermined number of commands, whichever occurs first.

Once it has been determined that the one or more command is to be flushed, the driver 214 may cause the one or more command to be submitted to the command queue.

As commands in the command queue are issued for processing by the command processor, further processing of input data occurs at the general purpose processor 210, for example at the application 212 and driver 214. This may result in one or more further command being generated by the driver and flushed to the command queue. This process can repeat.

The commands may be issued from the command queue under the control of a scheduler, or the commands may issue from the command queue in the order in which they were submitted to the command queue. Some combination of these approaches is possible. For example, commands may generally issue from the command queue in the order in which they were submitted to the command queue, but the scheduler may modify the order of the commands in the command queue, and/or select important commands to be issued more quickly than their submission order would otherwise dictate. When a command issues from the command queue, it is processed by the command processor. The processing of the command causes one or more operation to be performed by the rendering and shading logic. Execution of one or more such operation may cause data to be stored in at least one of the depth buffer 236, the stencil buffer 238 and the colour buffer 240. For example, an operation to process graphics data such as vertex data may comprise writing depth data corresponding to the vertex data to the depth buffer. During or after a render, the GPU may be caused to write out one or more of the depth buffer, the stencil buffer and the colour buffer. The command may comprise a configuration register value that instructs the GPU to perform the write operation. The command may comprise a pointer to data in memory such as external memory which comprises an instruction or set-up data that instructs the GPU to perform the write operation.

As mentioned above, the system may be configured to determine whether, following such a write operation, there is an access request to the written data. Determining whether there is an access request in respect of the written data may comprise tracking operations (such as a read operation) to be executed in response to the commands flushed to the command queue and/or issued from the command queue. The determination may be made by the driver. For example, the driver may track commands flushed to the command queue. The driver may maintain a data structure that indicates, for a particular render or series of renders, such render(s) identified by one or more render identifier, whether a command will cause the written data to be accessed. The driver is suitably configured to determine whether an API call to 'clear' and/or 'invalidate' the buffers occurs during processing of input data (e.g. whether an implicit or explicit invalidation of the buffers occurs).

Where there is an access request in respect of the written data, for example an access request which would occur between the write operation to cause that data to be written and an invalidation of the written data, the write operation is necessary and should not be prevented. Where there is no access request in respect of the written data, for example there is no access request which would occur between the write operation to cause that data to be written and an invalidation of the written data, the write operation is not necessary and memory bandwidth and processing power savings can be made by preventing the write operation from executing. The driver may be configured to determine whether there is an invalidation or clear of the data without an intervening access request in respect of the written data. The system may be configured to control the completion of the execution of the write operation in dependence on the determination. For example, the driver may be configured to control the completion of the execution of the write operation in dependence on the determination. The system may be configured to control the completion of the execution of the write operation by at least one of modifying a command in the command queue, modifying a command leaving the command queue and modifying the behaviour of the GPU in response to processing of a command.

In some examples the system is configured to modify a command and/or modify the behaviour of the GPU in response to a signal. The signal may, in some examples, be generated by the driver, such as by a driver unit at the driver. Signal 219 in FIG. 2 shows the driver 214 signalling to the command queue 222, for example to instruct the command queue 222 to search for a given render (by identifying the command and the particular buffer of data that does not need to be written). The command queue 222 can then search for the identified render in the queue, and modify the command accordingly. Alternatively, signal 218 in FIG. 2 shows the driver 214 signalling to the command processor 224, for example to instruct the command processor 224 to store the identity of a render (by identifying the command and the particular buffer of data that does not need to be written) so that when the relevant command is received at the command processor 224 it can modify the command so that the data buffer is not written.

Figure 3:
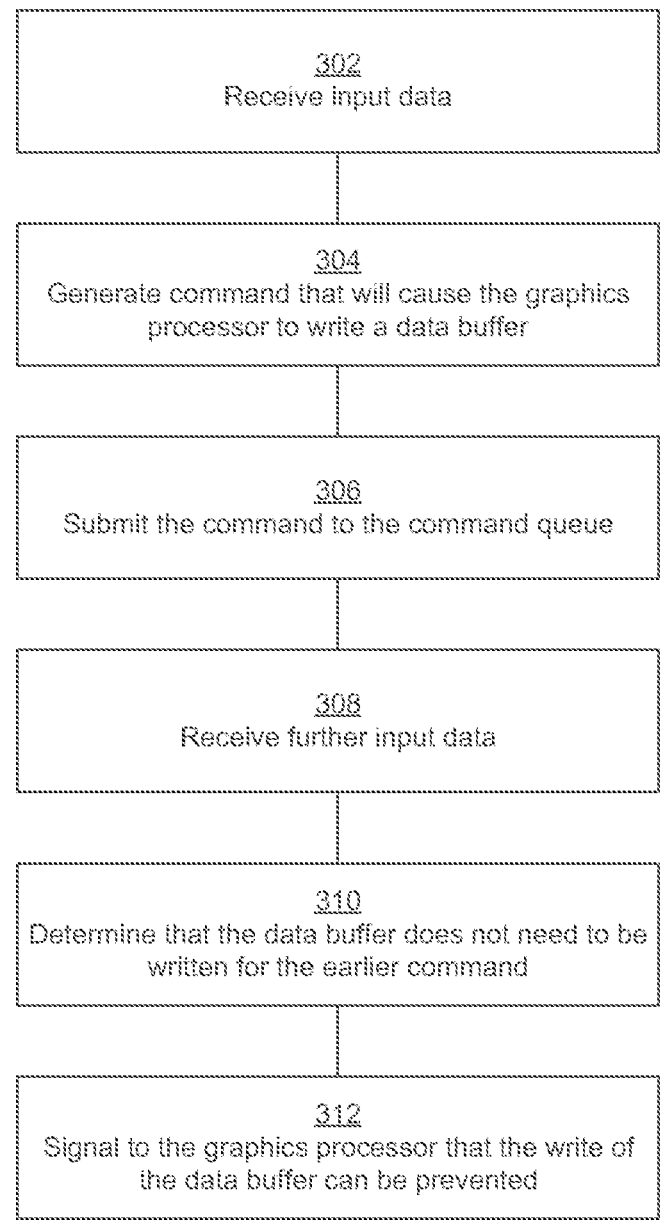
FIG. 3 shows a flow chart of a process of controlling execution of a write operation.

A process of controlling execution of a write operation, such as by modifying a command, will now be described with reference to the flow chart in FIG. 3. The flowchart in FIG. 3 shows operations that may be performed by the driver. In step 302, input data is received. For example, this may be in the form of API function calls (such as draw calls etc.) At step 304 a command is generated that will cause the graphics processor to write a buffer of data (such as a depth buffer) to external memory. The command may be, for example, a render command comprising set up information for the graphics processor to perform a render, part of which includes the storing of the data buffer into external memory. The command is then submitted to the command queue in step 306 for later processing on the graphics processor. Further input data is then received in step 308, for example in the form of API function calls. It is then determined in step 310 whether the data buffer does not need to be written for the earlier submitted command. For example, this may comprise determining whether there is an access request in respect of that data which would occur between the execution of the write operation and the clearing or invalidation of that data, or whether the data is cleared or invalidated immediately after the command is submitted, implying that no access to the stored data can be made. In dependence on this determination, the execution of the write operation is controlled (step 312) by signalling to the graphics processor to prevent the write of the buffer of data.

Figure 3A:
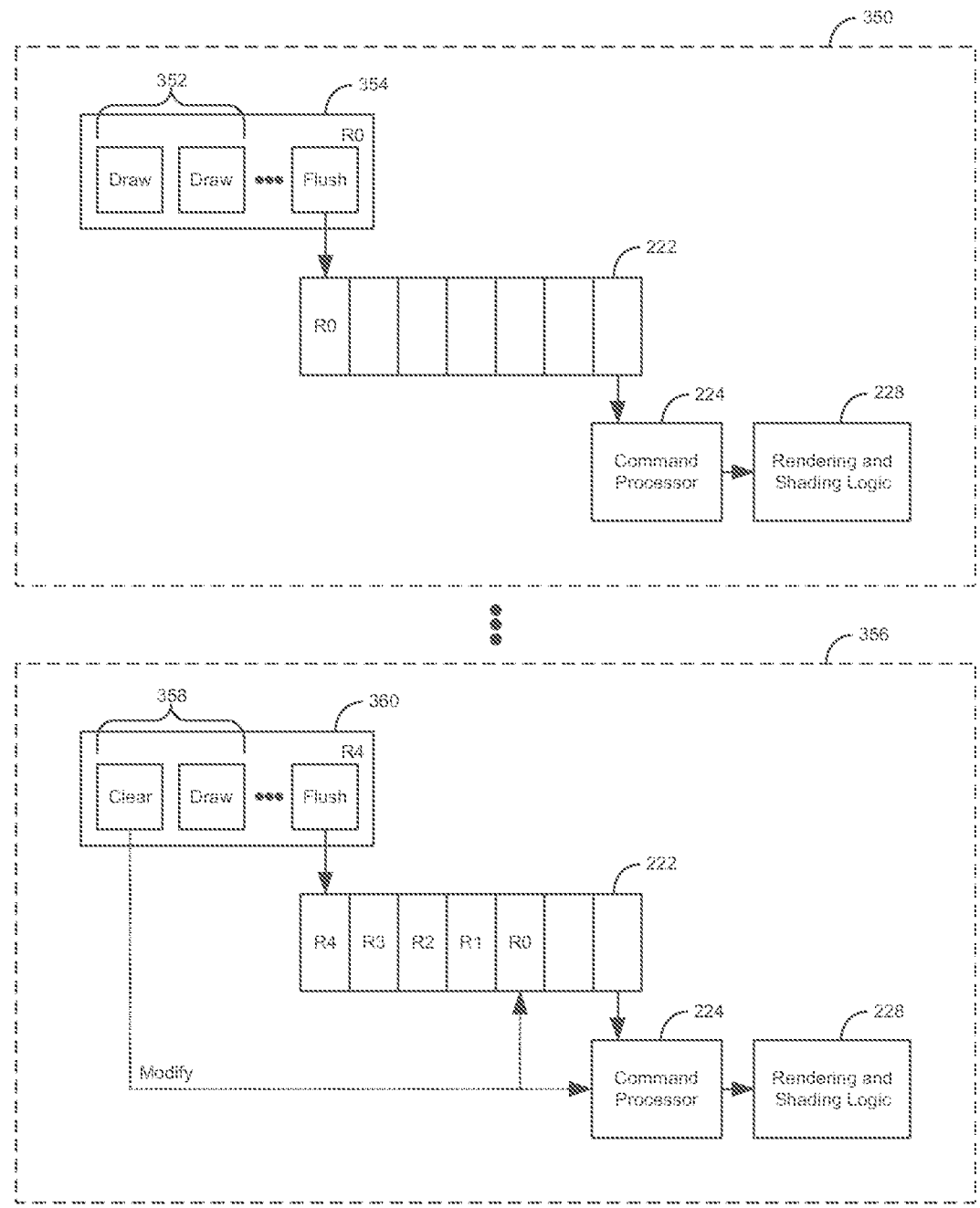
FIG. 3A shows an illustration of the operation of the flowchart of FIG. 3.

An exemplary illustration of the operation of the flowchart of FIG. 3 is shown in FIG. 3A. This figure shows a first time instance 350 in which input data 352 is received at the driver and from this a command R0 354 is generated. The command R0 is submitted/flushed to the command queue 222, where it is held until the graphics processor is able to process the command using the command processor and ultimately perform the render using the rendering and shading logic. At a subsequent time instance 356, further input data 358 is received at the driver. The further input data is used to generate a render command R4 360. This further input data comprises a "clear" call, indicating that the buffers should be cleared before the render is performed. The driver can then determine whether one or more of the buffers of data in the earlier command R0 are utilised before the clear call (for example by using the data structure described above). If one or more of the buffers of data in the earlier command R0 are not utilised/accessed by other renders, then a write out of this data to external memory can be avoided. The driver signals the graphics processor to modify the command (e.g. either by modifying the command R0 in the command queue 222 or at the command processor 224). As illustrated in FIG. 3A, because command R0 is still present in the command queue 222 and it has not yet been processed by the graphics processor, and therefore the command can be modified and the write out to external memory avoided.

Thus, the system 200 can avoid writing data to the external memory where it is known, before that write occurs, that the data to be written will not be accessed. This avoidance of unnecessarily writing data can result in memory bandwidth and power consumption savings. Avoiding the unnecessary writing of data can therefore result in a faster and/or more efficient system.

Figure 4:
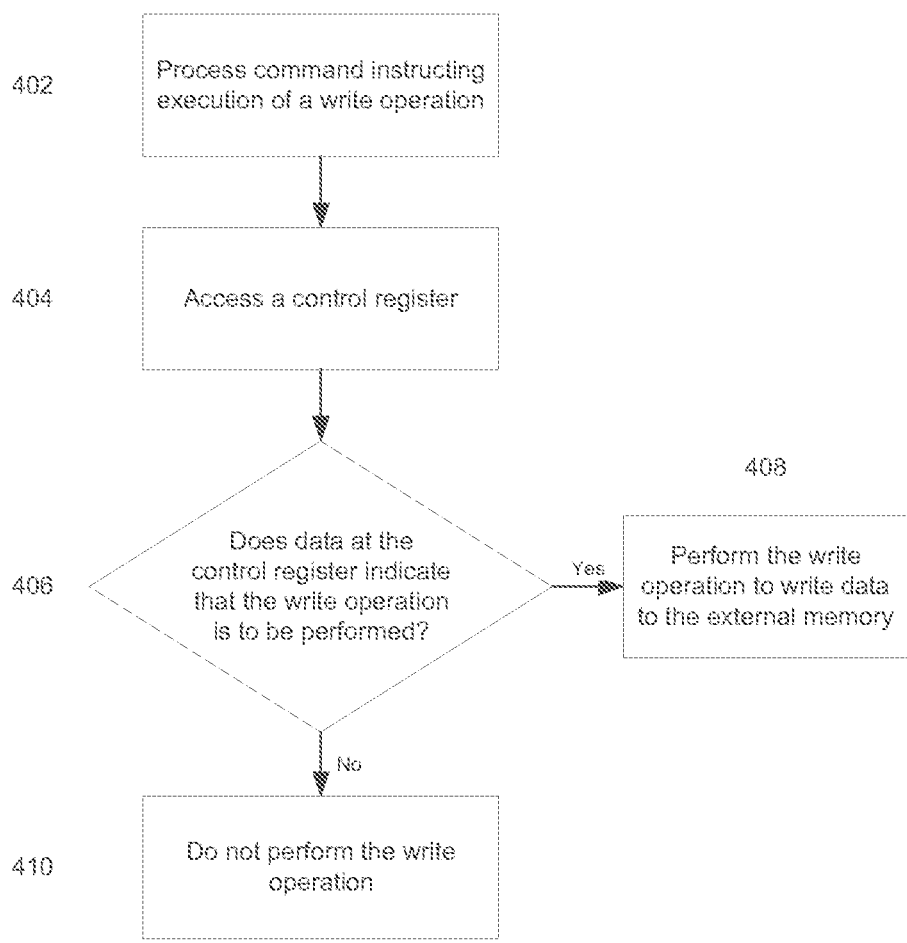
FIG. 4 shows a flow chart of a process of controlling the execution of a command.

The flow chart of FIG. 4 illustrates a process of controlling a write operation in dependence on a control register, for example in dependence on a configuration register value at the control register. At step 402, a command is processed which requires a write operation, such as a write operation to cause data such as buffer data to be written to external memory 250. The processing of the command causes various control register values to be set, to set up and initialise the operation of the graphics processor, e.g. for a particular render. The graphics processor will then perform the operations (such as performing the render) as instructed by the control register values (plus other data, such as graphics data stored in memory). Whilst performing the rendering operation, the control register, at which configuration register values may be stored, is accessed (step 404). A configuration register value associated with a particular data buffer may be read. For example, the configuration register value may control whether or not a particular data buffer (for example the depth buffer) should be written to external memory (e.g. at the end of the render). At step 406, it is determined whether data, for example a configuration register value, at the control register indicates that the write operation is to be performed or not for the associated data buffer. If the data indicates that the write operation is to be performed, then the write operation is performed to cause the buffer data to be written to external memory (step 408). If the data indicates that the write operation is not to be performed, then the write operation is not performed (step 410).

In some examples, the write operation can be related to one or more other operation for execution. It can therefore be desirable for the execution of the one or more other operation to be prevented from completing, as well as preventing the write operation from completing. In one example, where buffer data is to be written to external memory, the data can be compressed or packed before being written. In this case, if the data is not to be written, i.e. if it is desired to prevent the write operation from executing, then there no need to compress or pack the data for writing. Even where the execution of such an operation may not directly affect the memory bandwidth of the system, it can still unnecessarily take up processing time and power. It has been found that preventing the completion of execution of such other operations can also be beneficial to the system.

In some examples, operations for execution can be grouped into tasks. Operations in tasks may be related to one another. For example, a compression operation, for causing compression of particular data, and a write operation, for causing the writing of the compressed data to external memory, can both form part of a compression and write task.

In some examples the system, for example the driver, is configured to determine whether, following a write operation, there is an access request to the written data. The system may accordingly determine whether a task (i.e. operations making up that task) is to be executed, and to control execution of the entire task accordingly. For example, where a write operation is determined to be unnecessary, and that write operation is part of a task, it may be determined that the remaining operations of the task are also unnecessary. These remaining operations of the task, together with the write operation, may be prevented from executing. This approach can reduce the memory needed for the control registers, by grouping operations together, and enabling a plurality of operations to be associated with a single configuration register value. The single configuration register value may be used to control the execution of all the operations in that task.

The above discussion has focused on preventing the completion of an operation such as a write operation by modifying a command that will otherwise cause the write operation to be performed, before the command is initiated on the graphics processor. For example a setting to cause a write operation can be disabled/deactivated before the graphics processor starts processing a command. It is also possible to make use of the above techniques to prevent the completion of an operation after that command has been initiated on the graphics processor. For example, the graphics processor could already have started processing a command (e.g. a render has started), but it might still be desirable to stop a write operation. This can be achieved, for example, by modifying the contents of a configuration register in the graphics processor at any time up to the point where the configuration register is read and the write operation is triggered. This can provide the driver with additional time to detect that a buffer does not need to be subsequently used and the write of the buffer of data to external memory can be avoided.

In the above discussion, data at a control register, for example a configuration register value is used to control whether the graphics processor writes out data (e.g. at the end of a render). This can be used to control the writing of data by the graphics processor, such that if a register is set then a corresponding buffer of data is written out to external memory when the render completes, and if that register is not set then the corresponding buffer of data is not written out to external memory when the render completes. Alternatively or additionally, the data at the control register can be checked during the execution of the operation. For example, the data at the control register can be accessed periodically whilst the operation is occurring. This can be useful for operations that take longer to execute, such as external memory writes that occur in multiple stages or blocks. The period at which the control register data is checked, for example by the rendering logic can be set such that a subsequent check of the control register value is only made during the execution of relatively longer operations, for example operations that take (or are predicted to take) longer than a threshold length of time, or processor clock cycles, and/or operations relating to an amount of data greater than a threshold amount of data. This can be achieved by setting the period for control register checks to be longer than the average time of execution of relatively shorter operations, but less than the average time of execution of longer operations. This permits the system to perform a check that the execution of longer operations remains useful to the system, whilst such longer operations are executing.

The techniques above are also useful when considering multisample renders. A multisample write can be combined with a single-sample write in the same render. This will incur additional bandwidth cost for each write. In some situations, the multisample data may not be needed; it may be sufficient to retain the single-sample data. In some examples, the multisample data, such as a multisample surface, can be resolved into single-sample data, for example a single-sample surface. For example, multisample data can be averaged to resolve to single-sample data. Where the single-sample data is sufficient, the additional writes of multi-sample data can be avoided. An example of a situation in which a write of multisample data would be unnecessary is in a system that requires single-sampled output for a particular frame. At some time before that frame is complete, there may be some other access that also requires single-sampled output. At this point, the driver cannot determine that there is no future need of the multi-sampled data, so both multi- and single-sampled outputs should be written out to memory. The driver may then see that an end of frame has occurred with no subsequent use of multisample data. Thus the multisample write would have been unnecessary. Avoiding the multisample writes can avoid up to 9 additional write operations. Thus avoiding at least one multisample write permits a reduction in the memory bandwidth required.

Thus, it can be seen that commands, which would cause the execution of one or more operation such as a write operation, that have been submitted for processing, can be subsequently modified, before execution of those operations. This modification can be carried out based on information determined after the submission of the commands to a command queue.

In some examples, the system, for example the driver, can be configured to generate an interrupt signal for causing the processing of a render (in response to a command) on the graphics processor to be interrupted. This can permit the prevention of the completion of the execution of the write operation once processing of the command has been initiated. An example of a situation where this is useful is where the driver signals that a write operation in respect of depth buffer data was unnecessary at a moment where the render in question was being executed. In a tile-based rendering system, such as a tile-based deferred rendering system, separate writes of depth data may occur for each tile. If, during a render, some tiles have yet to write out their depth data, it is advantageous to stop at least those tiles from writing out their depth data unnecessarily. This means that at least some bandwidth could be saved.

The system of FIG. 2 is shown as comprising a number of functional blocks. This is schematic only and is not intended to define a strict division between different logic elements of such entities. Each functional block may be provided in any suitable manner. It is to be understood that intermediate values described herein as being formed by a system need not be physically generated by the system at any point and may merely represent logical values which conveniently describe the processing performed by the system between its input and output.

The system described herein may be embodied in hardware on an integrated circuit. The system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an apparatus configured to perform any of the methods described herein, or to manufacture a system comprising any apparatus described herein. An integrated circuit definition dataset may be, for example, an integrated circuit description.

There may be provided a method of manufacturing, at an integrated circuit manufacturing system, an apparatus for controlling processing at a system as described herein. There may be provided an integrated circuit definition dataset that, when processed in an integrated circuit manufacturing system, causes the method of manufacturing a system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a system will now be described with respect to FIG. 5.

Figure 5:
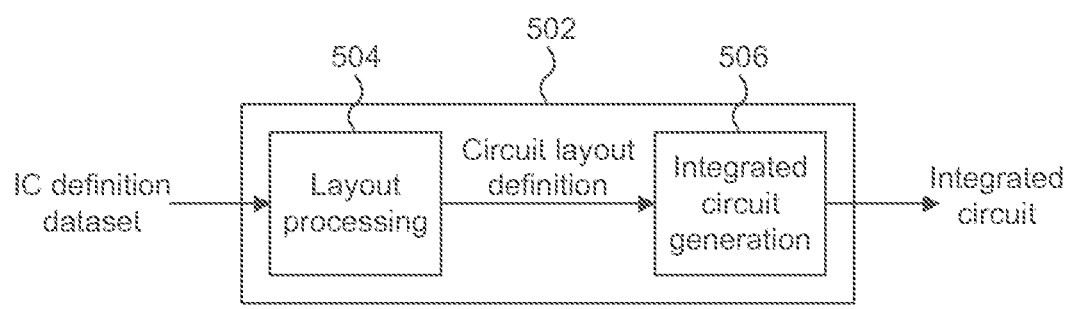
FIG. 5 is a schematic diagram of an integrated circuit manufacturing system.

FIG. 5 shows an example of an integrated circuit (IC) manufacturing system 502 which is configured to manufacture an apparatus as described in any of the examples herein. In particular, the IC manufacturing system 502 comprises a layout processing system 504 and an integrated circuit generation system 506. The IC manufacturing system 502 is configured to receive an IC definition dataset (e.g. defining an apparatus as described in any of the examples herein), process the IC definition dataset, and generate an IC according to the IC definition dataset (e.g. which embodies an apparatus as described in any of the examples herein). The processing of the IC definition dataset configures the IC manufacturing system 502 to manufacture an integrated circuit embodying an apparatus as described in any of the examples herein.

The layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. A circuit layout definition may be, for example, a circuit layout description.

The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC.

The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A system for controlling processing of commands submitted in a queue for processing at a graphics processor, to cause the graphics processor to write at least one buffer of data to an external memory, the system comprising a driver operable to communicate with the graphics processor,
the system being configured to access data related to a command of said submitted commands for processing at the graphics processor, the accessed data indicating whether a buffer of data is to be written to external memory, and to determine in dependence on the accessed data that the buffer of data does not need to be written to external memory by being configured to determine whether there is one or both of an implicit invalidation of the data and an explicit invalidation of the data; and
the driver being configured to signal to the graphics processor to prevent at least a portion of the write to external memory from being performed for the command.

2. The system according to claim 1, wherein the system is configured to access the data related to the command during an operation to write the buffer of data to external memory.

3. The system according to claim 2, wherein the system is configured to periodically access the data related to the command whilst the operation is occurring.

4. The system according to claim 2, wherein the system is configured to access the data related to the command where it is determined that: the operation will take longer than a threshold length of time, and/or the operation will take longer than a threshold number of clock cycles, and/or the operation relates to an amount of data greater than a threshold amount of data.

5. The system according to claim 1, in which the system further comprises rendering logic, and the rendering logic is configured to access the data related to the command.

6. The system according to claim 1, in which the write to external memory occurs in multiple stages or blocks.

7. The system according to claim 1, wherein the system is configured to determine that the buffer of data does not need to be written to external memory by being configured to determine that subsequent commands will not use the buffer of data stored at the external memory.

8. The system according to claim 7, wherein the system is configured to determine that subsequent commands will not use the buffer of data stored at the external memory by being configured to determine that input data received at the system does not request access to the buffer of data prior to the buffer of data being cleared or invalidated.

9. The system according to claim 8, wherein the system further comprises a data structure, and the system is configured to determine that the input data does not request access to the buffer of data prior to the buffer of data being cleared or invalidated by being configured to:
maintain the data structure to track access requests to the buffer of data received in the input data; and
analyse the data structure when a function to clear or invalidate the buffer of data is received to determine whether a prior access request was made.

10. The system according to claim 1, wherein the command comprises at least one configuration register setting that will cause the graphics processor to write the at least one buffer of data to the external memory.

11. The system according to claim 1, wherein the driver is configured to signal to the graphics processor to prevent at least a portion of the write to external memory from being performed for the command by being configured to one or more of:
signal to said queue, to which the command is submitted for later processing at the graphics processor, to modify the command held in the queue, such that the command will not cause the graphics processor to write out at least one buffer of data to the external memory,
signal to the graphics processor to modify the command prior to being processed, such that the command will not cause the graphics processor to write out at least one buffer of data to the external memory,
signal to the graphics processor to modify the command while the command is being processed, such that the command will not cause the graphics processor to write out at least a portion of the at least one buffer of data to the external memory, and
generate an interrupt signal to cause the graphics processor to stop processing the command.

12. The system according to claim 11, further comprising a command processor, wherein the command processor is configured, responsive to the signal, to store an identifier for the command and at least one buffer of data and modify the command responsive to determining that the command received for processing has a matching identifier.

13. The system according to claim 1, wherein the command comprises a pointer to a location in the external memory which comprises set-up data that will cause the graphics processor to write the at least one buffer of data to the external memory.

14. The system according to claim 1, wherein the command comprises at least one pointer to graphics data stored in the external memory.

15. The system according to claim 1, wherein the command submitted for processing is submitted to said queue for later processing at the graphics processor, and wherein the queue is a command queue configured to store commands at the graphics processor until they can be processed at the graphics processor.

16. The system according to claim 1, wherein the driver is further configured to receive initial input data and generate the command for processing at the graphics processor from the initial input data, the initial input data comprising a plurality of application programming interface function calls.

17. The system according to claim 1, wherein input data received at the system comprises a plurality of application programming interface function calls comprising at least one of:

a clear function configured to cause the buffer of data stored in the external memory to be cleared; and an invalidate function configured to cause the buffer of data stored in the external memory to be invalidated.

18. A method for controlling processing of commands submitted in a queue for processing at a graphics processor, to cause the graphics processor to write at least one buffer of data to an external memory, the method comprising:

accessing data related to a command of said submitted commands for processing at the graphics processor, the accessed data indicating whether a buffer of data is to be written to external memory;

determining in dependence on the accessed data that the buffer of data does not need to be written to external memory by determining whether there is one or both of an implicit invalidation of the data and an explicit invalidation of the data; and signalling to the graphics processor to prevent at least a portion of the write to external memory from being performed for the command.

19. A non-transitory computer readable storage medium having stored thereon computer readable instructions that, when executed at a computer system, cause the computer system to control processing of commands submitted in a queue for processing at a graphics processor, to cause the graphics processor to write out at least one buffer of data to an external memory, the computer system being caused to access data related to a command of said submitted commands for processing at the graphics processor, the accessed data indicating whether a buffer of data is to be written to external memory;

determine in dependence on the accessed data that the buffer of data does not need to be written to external memory by determining whether there is one or both of an implicit invalidation of the data and an explicit invalidation of the data; and signal to the graphics processor to prevent at least a portion of the write to external memory from being performed for the command.

* * * * *